United States Patent [19]

Woley et al.

[11] 4,276,032
[45] Jun. 30, 1981

[54] KNEE JOINT FOR ANTHROPOMORPHIC DUMMY

[76] Inventors: Paul F. Woley, Ann Arbor; Michael J. Wolanin, Milford, both of Mich.

[21] Appl. No.: 161,576

[22] Filed: Jun. 20, 1980

[51] Int. Cl.³ .............................................. G09B 23/32
[52] U.S. Cl. .................................................... 434/274
[58] Field of Search ...................... 35/17; 73/432 SD

[56] References Cited

U.S. PATENT DOCUMENTS

| | | | |
|---|---|---|---|
| 3,557,471 | 1/1971 | Payne et al. | 35/17 |
| 3,755,920 | 9/1973 | Smrcka | 35/17 |
| 4,000,564 | 1/1977 | Haffner et al. | 35/17 |
| 4,235,025 | 11/1980 | Kortge | 35/17 |

*Primary Examiner*—Harland S. Skogquist
*Attorney, Agent, or Firm*—Robert M. Sigler

[57] ABSTRACT

A knee joint for the leg of an anthropomorphic dummy of the type used in vehicle crash testing comprises a femur member including a disk portion with a widened rim and a central axial opening, a tibia member, at least one first joint member pivotably attached to the femur member adjacent the central axial opening and including a slide track thereon with a stop surface at the forward end thereof, friction surfaces on the first joint member and disk portion just outside the central axial opening, adjustment apparatus extending through the central axial opening effective to adjust the axial force and thus the friction force between the friction surfaces, at least one second joint member fixed to the tibia member slidably attached to the slide track of the first joint member for sliding movement toward and away from the stop surface in a direction substantially perpendicular to the tibia member and at least one resilient member disposed between the first and second joint member and having a pair of opposing surfaces fixed to the first and second joint members, respectively, whereby sliding movement of the second joint member away from the stop surface generates a restoring force opposing said movement.

2 Claims, 3 Drawing Figures

KNEE JOINT FOR ANTHROPOMORPHIC DUMMY

BACKGROUND OF THE INVENTION

This invention relates to knee joints for anthropomorphic dummies used in crash testing of motor vehicles and is particularly an improvement of the knee joint shown in the U.S. patent application Ser. No. 061,018, filed by James O. Kortge on July 26, 1979 and assigned to the assignee of this application, and now U.S. Pat. No. 4,235,025.

Prior art anthropomorphic dummies used for vehicle crash testing generally had knee joints comprising simple hinges which allowed only rotation of the tibia with respect to the femur about the axis of the hinge. However, the actual knee of a human vehicle occupant in a seated position with the tibia at an approximate right angle to the femur may exhibit a translational or shearing motion between the tibia and femur when the knee or tibia is subjected to a frontal load of sufficient magnitude. Additionally, recent research has provided some indication of the allowable femur to tibia translational motion which the human knee can withstand before knee injury occurs. Therefore, it may be possible to test for shearing knee injuries in vehicle crash tests if a dummy knee is provided which allows such translational shearing motion when the tibia is in an approximate right angle to the femur. To prevent the recording of false data on such shearing motion, the knee design should not allow such shearing motion from a frontal load when the tibia is in line with the femur as when the lower leg is raised, since the allowable stress to the knee is different in that leg configuration.

The aforementioned Kortge patent application discloses a dummy knee joint which should provide the required rotational motion and translational motion of the tibia at a substantially right angle to its direction while preventing translational motion of the tibia parallel to its own direction. However, that design fails to provide some features which would be quite desirable in a practical working model of such a dummy knee joint. For example, it would be desirable to provide means for independently adjusting the rotational friction of the knee joint to simulate that of the human knee. In addition, it would be desirable for reproducible test results to define a specific zero or no load translational position of the tibia with respect to the femur, so that the reference readings of the motion transducers may be established. It would also be desirable to provide such a knee joint which is self-contained with few projecting parts which might be susceptible to breakage or misalignment and able to be fit within the present dummy leg without redesign of that leg.

SUMMARY OF THE INVENTION

It is therefore an object of this invention to provide a knee joint for an anthropomorphic dummy which allows rotational motion between tibia and femur with an independently adjustable rotational friction and further allows shearing translation between the tibia and femur in response to a load applied substantially at a right angle to the tibia with a restoring force against such shearing translational motion.

It is another object of this invention to provide a knee joint for an anthropomorphic dummy which allows rotation between the tibia and femur and a shearing translation between the tibia and femur in response to a load applied substantially at a right angle to the tibia and further defines positively a normal or zero translational position of the tibia with respect to the femur for calibration of the transducers used to measure such translational motion.

It is yet another object of this invention to provide a knee joint for an anthropomorphic dummy which meets the first two objects and provides a self-contained, protected package which fits within the present dummy leg without major redesign of that leg.

These and other objects are realized in a knee joint in which a first joint member is pivotably attached to the femur and includes a slide track on which a second joint member, fixed to the tibia, may slide at a substantially right angle to the tibia. Stop means on the first and second joint members limit forward movement of the second with respect to the first and thereby define a reference or zero position. A resilient member disposed between the first and second joint members has a pair of opposing surfaces fixed to the first and second joint members, respectively, to provide a restoring force against separation of the stop means of the first and second joint members, which restoring force may be matched to that of a typical human knee. In addition, a pair of contacting friction surfaces are defined on the first joint member and femur, the surfaces being perpendicular to the pivoting axis of the first joint member and thereby effective to create frictional resistance to rotation between the tibia and femur members. Apparatus is further provided to vary the normal force between the friction surfaces and thereby allow independent control of the frictional force.

Further details and advantages of this invention will be apparent from the accompanying figures and following description of a preferred embodiment.

DESCRIPTION OF A PREFERRED EMBODIMENT

Figure 1:
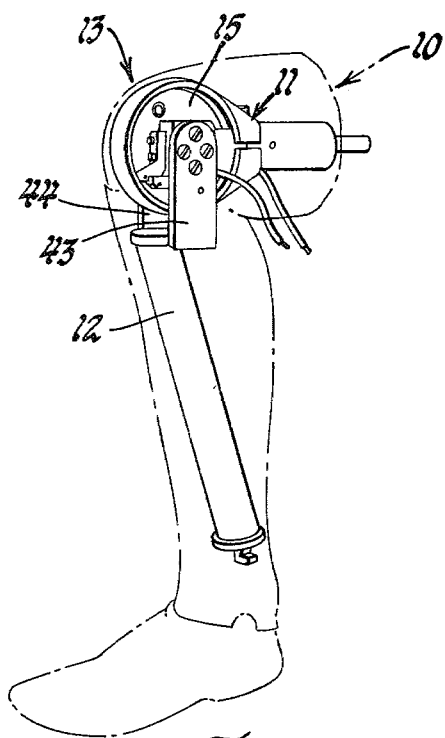
FIG. 1 shows a perspective view of a knee joint according to this invention as disposed in a dummy leg.

FIG. 1 shows a portion of the leg 10 for an anthropomorphic dummy used in vehicle crash testing. Leg 10 includes a femur member 11 which comprises the upper part of leg 10 and a tibia member 12 which comprises the lower part of leg 10. The femur member 11 and tibia member 12 are joined in a knee joint, generally indicated at 13.

Femur member 11 includes a generally circular disk portion 15 having a rim portion 16 which is widened in both axial directions to help contain and protect the rest of the knee joint apparatus. Disk portion 15 further has a central axial opening 17 therethrough.

Figure 3:
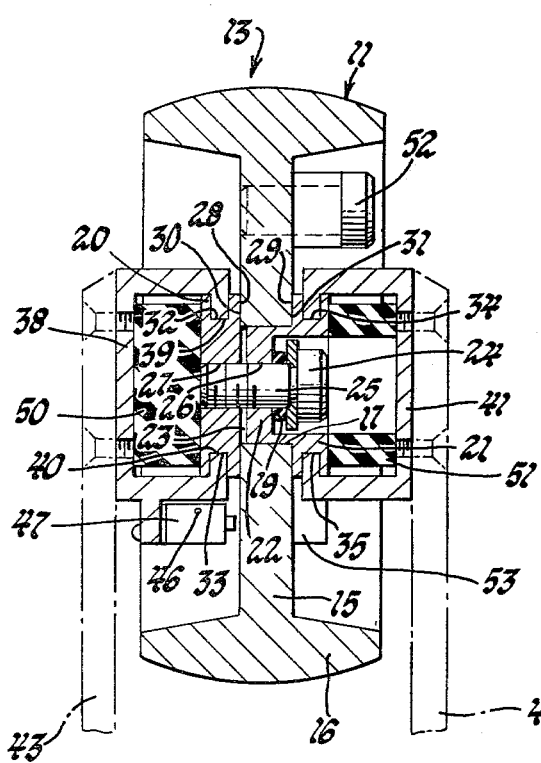
FIG. 3 shows a section view along the lines 3—3 in FIG. 2.

Disposed on either side of the disk portion 15 adjacent opening 17 are first joint or track members 20 and 21. Track member 21 has a projecting portion 22 which projects into opening 17 of disk portion 15, as shown in FIG. 3. A gap 23 exists between track members 20 and 21 within opening 17 of disk portion 15; and an axially disposed bolt 25 projects through an axial opening 26 in track member 21 and threads into an axial opening 27 in track member 20. Track members 20 and 21 further include frictional surfaces 28 and 29, respectively, which are pressed against friction surfaces 30 and 31, respectively, of disk portion 15, just radially outside axial opening 17, as bolt 25 is tightened to draw track members 20 and 21 together. A urethane washer 19 under head 24 of bolt 25 evens the friction force as track members 20 and 21 are rotated relative to disk portion 15. Thus, bolt 25, which is accessible for adjustment from outside the dummy leg, provides an adjustment of rotational friction for knee joint 13 which is independent of the angular position of knee joint 13 or, as will be seen below, the translational position of knee joint 13.

Figure 2:
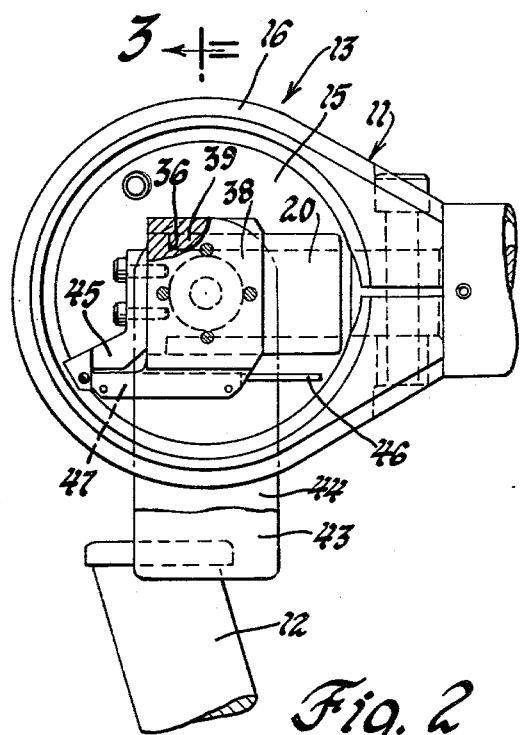
FIG. 2 shows a side elevational view, partially cutaway, of the knee joint of FIG. 1.

Track member 20 has a pair of grooves 32 and 33 which run most of the length thereof, while track member 21 has a similar pair of grooves 34 and 35. Each of the grooves 32 and 33 defines, at the forward end thereof, a raised stop surface such as surface 36 in FIG. 2. A second joint or slide member 38, generally shaped in cross-section as a letter C, has a pair of ends 39 and 40 which ride in grooves 32 and 33, respectively. Slide member 38, as it slides in the forward direction, thus abuts the pair of stop surfaces; and this defines a zero or reference position for a shearing translation for knee joint 13. Another second joint or slide member 41 slides similarly in grooves 34 and 35 of track member 21. Stop surfaces, not shown, may be included at the rearward ends of grooves 34 and 35 to limit movement of slide member 41 in the opposite or rearward direction. Slide members 38 and 41 are fixed to, and therefore may be considered part of, extensions 43 and 44, respectively, of tibia member 12. An extension 45 of track member 20 serves as an anchor for one end of slide member 46 of a linear position transducer 47 attached to slide member 38.

Within slide members 38 and 41 are disposed resilient members 50 and 51, respectively. Each of resilient members 50 and 51 is, in this embodiment, a rectangular block of resilient material such as rubber which has one surface bonded to the respective track member and an opposite surface bonded to the respective slide member. The parts are bonded in an arrangement such that the resilient members are not substantially distorted when the slide members abut the stop surfaces of the track members. Thus, with translational movement of the tibia to move the slide members away from the stop surfaces of the track members, the resilient members 50 and 51 will be distorted and will therefore exert a restoring force. Selection of the precise material characteristics of resilient members 50 and 51 allows the designer to match the restoring force to the characteristics of the human knee as determined from existing studies. The use of butyl rubber for resilient members 50 and 51 provides desirable damping. The restoring force exerted by this apparatus shows a substantially linear increase with displacement for substantially the entire range of displacements expected in vehicle crash tests. Resilient member 51, as well as slide member 41, is provided with an axial opening to allow access to bolt 25.

While shearing translational motion of the tibia 12, that is, translational movement of tibia 12 at a substantially right angle to its extended length, is permitted by the track and slide arrangement of knee joint 13, translational movement of tibia 12 in a direction parallel to its own length is not so permitted. Thus, if the lower leg of the dummy as pictured in FIG. 1 should happen to swing upward until it was parallel to the upper leg before a load was exerted on it through the foot in a direction parallel to the leg, no translational motion of the tibia 12 would be allowed. This is consistent with the observed behavior of human legs and knees under the same circumstances.

Rotational movement is allowed through a range determined by a rotational stop 52 fixed to one side of disk portion 15 of femur member 11 and an extension 53 of track member 21 which extends radially outward sufficiently far to engage rotational stop 52 when the lower leg is rotated outward sufficiently far. Backward rotation of the lower leg will be limited, as in the case of the human leg, by compression of the "fleshy" material of the calf and thigh. It can be seen that in this apparatus rotational and shearing translational motion are completely independent of each other so that rotational position or motion does not affect the restoring force for translational motion nor does translational position or motion affect the friction force exerted against a rotational motion. The joint is adjustable for both rotational friction and shearing translational restoring force in accordance with observed characteristics of human knees; and positive stops enable consistent calibration of transducers for shearing translational movement. The moving parts of the knee joint are sufficiently rugged to withstand the forces encountered in crash testing of motor vehicles but form a compact assembly which is self-contained within a protected environment formed by the rim 16 of femur 11.

With regard to materials, disk portion 15 is made of hard coated aluminum, track members 20 and 21 are Ampco 21 aluminum bronze, resilient members 50 and 51 are butyl rubber and most other parts may be stainless steel or any other appropriate material.

Although the embodiment described above is a preferred embodiment, other equivalent embodiments will occur to those skilled in the art. Therefore this invention should be limited only by the following claims.

The embodiments of the invention in which an exclusive property or privilege is claimed are defined as follows:

1. A knee joint for the leg of an anthropomorphic dummy of the type used in vehicle crash testing, the knee joint comprising, in combination:
   a femur member comprising at least part of the upper leg of the dummy;
   a tibia member comprising at least part of the lower leg of the dummy;
   a first joint member pivotably attached to the femur member and including a slide track thereon;
   means defining a pair of contacting friction surfaces on the femur and first joint member perpendicular to the pivoting axis of the first joint member and effective to create frictional resistance to rotation between the first joint member and femur member;
   means effective to vary the normal force between the friction surfaces and thereby vary the frictional force therebetween;
   a second joint member fixed to the tibia member and slidably attached to the slide track of the first joint member for sliding movement in a direction substantially perpendicular to the tibia member;
   stop means on said first and second joint members limiting forward movement of the second with respect to the first and thereby defining a normal position thereof; and
   a resilient member disposed between the first and second joint members and further having a pair of opposing surfaces fixed to the first and second joint members, respectively, whereby sliding movement of the first and second joint members away from the normal position generates a restoring force opposing said movement.

2. A knee joint for the leg of an anthropomorphic dummy of the type used in vehicle crash testing, the knee joint comprising, in combination:

a femur member comprising at least part of the upper leg of the dummy and further comprising a substantially circular disk portion with a central axial opening therethrough and a rim widened in both axial directions;

a tibia member comprising at least part of the lower leg of the dummy and further comprising a pair of extensions extending on either side of the disk portion of the femur member;

a pair of first joint members disposed on opposite sides of the disk portion adjacent the axial opening thereof and each including a slide track thereon with a stop surface at the forward end thereof, at least one of the first joint members having an extension projecting into the axial opening of the disk portion, each of the first joint members further having a friction surface which contacts one of the friction surfaces of the disk portion;

adjustable fastener means effective to exert a joining force between the first joint members, whereby the rotational friction of the knee joint may be adjusted independently of translational movement thereof;

a pair of second joint members fixed to the extensions of the tibia member, respectively, and slidably attached to the slide tracks of the first joint members, respectively for sliding movement toward and away from the stop surface in a direction substantially perpendicular to the tibia member; and a pair of resilient members, each of said resilient members having a pair of opposing surfaces fixed to the first and second joint members, respectively, on one side of the disk portion, whereby shearing translational motion of the tibia with respect to the femur from the stop position generates a restoring force opposing said motion and not affected by the rotational position of the tibia with respect to the femur.

* * * * *

UNITED STATES PATENT AND TRADEMARK OFFICE
CERTIFICATE OF CORRECTION

PATENT NO. : 4,276,032
DATED : June 30, 1981
INVENTOR(S) : Paul F. Woley and Michael J. Wolanin It is certified that error appears in the above—identified patent and that said Letters Patent is hereby corrected as shown below:

On the cover page at [73] insert -- Assignee: General Motors Corporation, Detroit, Mich. --.

Signed and Sealed this

Eighth Day of December 1981

[SEAL]

Attest:

GERALD J. MOSSINGHOFF

*Attesting Officer*     *Commissioner of Patents and Trademarks*